US007557971B1

(12) United States Patent
Sigel et al.

(10) Patent No.: US 7,557,971 B1
(45) Date of Patent: Jul. 7, 2009

(54) SYSTEM AND METHOD FOR MANAGING MULTIPLE WRITE SESSIONS TO HOLOGRAPHIC STORAGE MEDIA

(75) Inventors: Christophe N. Sigel, Broomfield, CO (US); Michael L. Leonhardt, Longmont, CO (US)

(73) Assignee: StorageTek Technology Corporation, Louiville, CO (US)

( * ) Notice: Subject to any disclaimer, the term of this patent is extended or adjusted under 35 U.S.C. 154(b) by 251 days.

(21) Appl. No.: 11/372,689

(22) Filed: Mar. 10, 2006

(51) Int. Cl.
*G03H 1/28* (2006.01)
(52) U.S. Cl. ........................................ 359/24; 359/900
(58) Field of Classification Search .................. 359/22, 359/24, 25, 35, 900; 430/1, 2
See application file for complete search history.

(56) References Cited

U.S. PATENT DOCUMENTS

| | | | |
|---|---|---|---|
| 5,703,705 A | 12/1997 | Curtis et al. | |
| 5,949,558 A | 9/1999 | Psaltis et al. | |
| 7,133,170 B1 * | 11/2006 | Uchida et al. | 359/3 |
| 2004/0179251 A1 | 9/2004 | Anderson et al. | |
| 2005/0264860 A1 * | 12/2005 | Toishi | 359/22 |

* cited by examiner

*Primary Examiner*—Alessandro Amari
(74) *Attorney, Agent, or Firm*—Brooks Kushman P.C.

(57) ABSTRACT

A holographic storage system records digital data to a holographic recording medium at recording locations that are strategically left open. A controller determines whether or not a predetermined event has occurred or a predetermined condition is present. If either the event occurs or the condition is present, the opened recording locations are closed. Subsequent data may be holographically recorded in open recorded locations as data appended to previously recorded data. The holographic storage system optionally includes an interim storage device. Controller may comprise a virtual storage controller.

9 Claims, 5 Drawing Sheets

SYSTEM AND METHOD FOR MANAGING MULTIPLE WRITE SESSIONS TO HOLOGRAPHIC STORAGE MEDIA

BACKGROUND OF THE INVENTION

1. Field of the Invention

The present invention relates to systems and methods for improving the storage efficiency of holographically written data, and in particular, to systems and methods for improving the storage efficiency of holographically written data in the context of multiple holographic write sessions.

2. Background Art

Holographic data storage ("HDS") is a form of optical data storage, whereby recording of data is achieved by illuminating a photosensitive medium with intersecting reference and data light beams. The spatial modulation of light intensity produced by interference of the beams is recorded in a holographic data storage medium by modification of the dielectric properties of the medium, either in the form of periodic spatial modulation of the refractive index of the medium or of the absorption of the medium, to constitute a grating or a hologram. One form of holographic data storage sequentially records localized holograms each containing a single bit, and is sometimes termed micro-holographic bit storage. Another form of holographic data storage comprises volumetric page holographic recording which allows a large amount of data to be recorded in parallel in the form of a 2 dimensional bit array or data page. This is accomplished by placing a spatial light modulator in the optical path of the data light beam. The spatial light modulator imparts a data page on the data light beam by modulating the spatial profile of the object beam. Detection upon readout is typically performed by imaging the reconstructed optical data signal upon a suitable photodetector, which may comprise a single photodetector for detecting a single bit signal or a two-dimensional photodetector array for detecting a two-dimensional data page.

Examples of optically sensitive media suitable for holographic data storage include photopolymer based materials. Recent advances have produced photopolymer material with excellent optical and mechanical properties, resulting in a suitable combination of high capacity, high data read and write transfer rates, and long term data stability. However, photopolymer media typically require additional media processing steps necessary to achieve high performance stable data recording.

Photopolymer based holographic media are "saturable", meaning that at a certain point their sensitivity decreases with the amount of exposure to light resulting in a decreased data write transfer rate during recording. The decrease in sensitivity occurs because most of the photosensitive species necessary for recording are used up. For practical applications, writing to a given region of the storage medium is stopped when a predetermined portion of photosensitive species has been consumed in order to maintain as high a data transfer rate as feasible. It is apparent that reaching this predetermined value does not mean that the medium is fully bleached or that the recording species are totally used up. It merely means that the photosensitive recording species are depleted to a sufficient extent that the internal data write transfer rate becomes lower than a predetermined minimum value. A typical threshold value may be proximate to 80% consumption of photosensitive species which equates to a proximate to 50% drop in write transfer rate from its maximum value.

Subsequent to a data recording to a region of the medium, photopolymer based holographic media are typically subjected to a "bleaching" process to "close" the region in order to render the medium stable for data readout. Closing is typically accomplished by directing a strong laser beam over the written area to complete photo reaction of remaining photoactive species. Additionally, the photopolymer based holographic media may require a photosensitization process prior to data recording for enabling high data transfer rate during actual data recording step. The process of sensitizing, recording to a region of the media and "fixing" that region is termed "a session".

It is also well known in the prior art that multiple data holograms can be recorded within a same recording volume by means of one of a plurality of multiplexing techniques. The techniques generally involve changing one of the properties of the reference beam used to record each data hologram such that the data can be selectively retrieved only by illumination of its data storage location in the holographic data storage medium by its associated reference beam. The collection of multiple data page holograms recorded at the same data storage location is sometimes referred to as a book, and is designated as such henceforth in the present invention. Accordingly, the holographic data storage medium records a layer of multiple spatially separate books, with the spacing between data storage locations typically limited by the maximum recording beam size within the thickness of medium and recording beam alignment tolerances.

Figure 1:
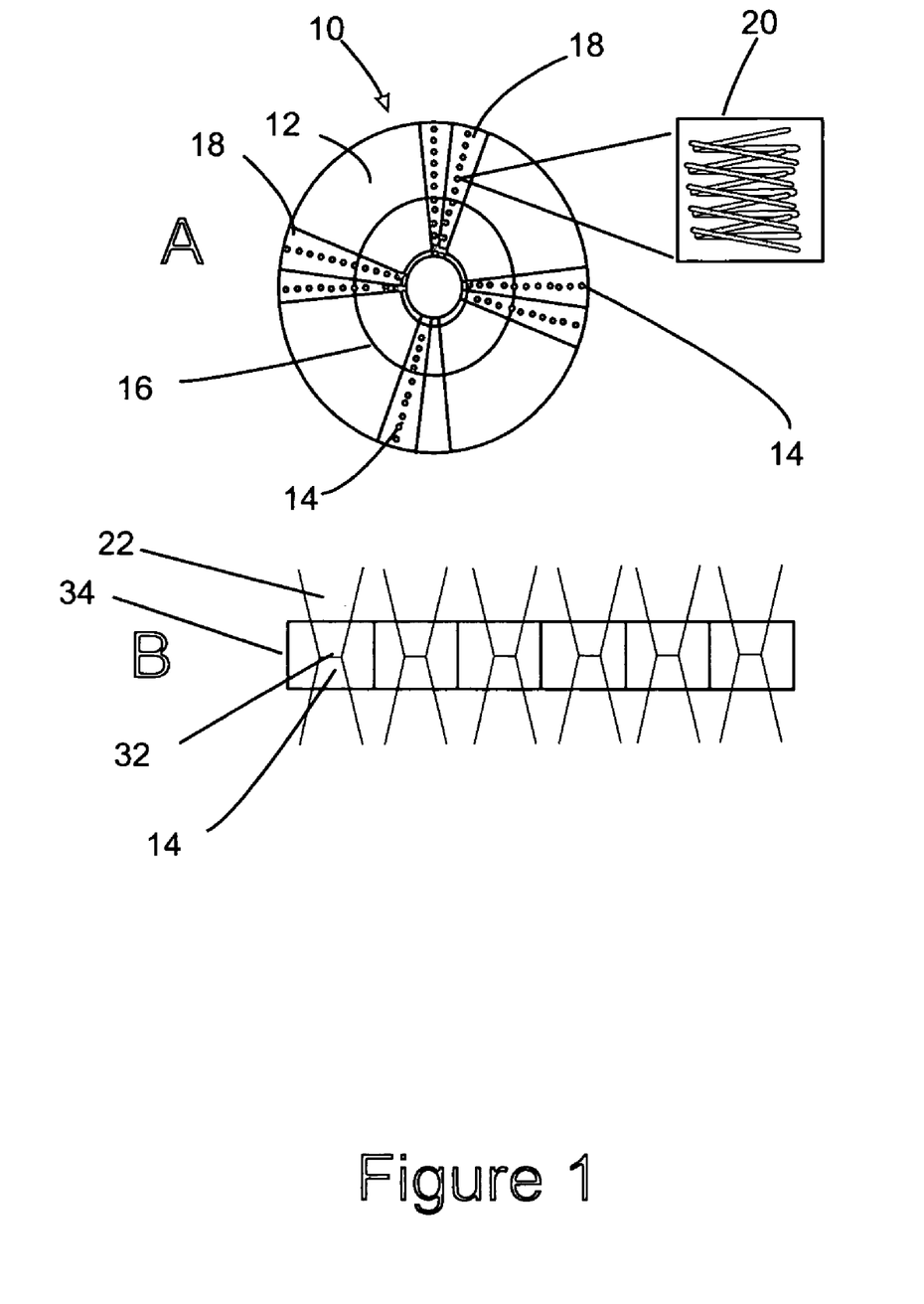
FIG. 1A is a schematic illustrating single layered data recording on a holographic storage disk.
FIG. 1B is a schematic demonstrating the writing to data locations in single layered data recording.

FIGS. 1A and 1B provide schematics illustrating single layered data recording on a holographic storage disk. FIG. 1A shows holographic storage disk 10 which includes single layer holographic storage medium 12. Digital data is encoded onto storage locations 14 along data tracks 16 in the manner set forth above. Disk 10 is divided into sectors such as, for example, sectors 18. Within each of sectors 18, multiple points may be proximately aligned on separate tracks 16. Blow up 20 shows that each location 14 contains multiple holograms. Typically, each hologram represents a single data page. Represented in blow up 20, each hologram has a slightly different orientation (i.e., angle multiplexing technique). FIG. 1B shows a cross-section of a region of the holographic data storage medium 12 to illustrate that multiple spatially separated books (and each containing multiple data pages) are recorded in the holographic data storage medium. The spacing between data storage locations typically is determined by the maximum recording beam size. In this case, books are not overlapping (i.e., spatially separated) and are not exactly contiguous because of system tolerances in terms of alignment, and also because of the off axis recording geometry where the beams are focused inside of the medium. Focusing allows data light beam 22 to achieve a minimum spot size 32 onto plane 34 in holographic storage medium 12. Outside of plane 34, divergence of the data light beam as well as the varying angle of incidence of the reference beam associated with each of the data pages stored into each of storage locations 14 causes an expanded recording area with a cone like shape. However, the area outside the cylinder formed around spot size 32 is only partially exposed.

The region separating neighboring data storage locations is, therefore, only partially recorded to during data recording, thus resulting in less than optimal utilization of the available recording volume of the holographic medium. To assure a region is properly closed, the curing beam must expose an area somewhat larger than the recorded area, to take into account the same beam alignment tolerances. If recording data to only a portion of a holographic storage medium, closing a session by illuminating the recorded partial region involves creating a boundary region around it. This boundary region represents lost capacity.

To further increase storage density, several techniques have been proposed for optimal utilization of the entire recording volume, see for example U.S. Pat. Nos. 5,949,558, 5,703,705 and U.S. Patent Publication No. US20040179251, which all involve the recording of multiple shifted partially overlapping books. However, their practical implementation requires certain tradeoffs. Ensuring uniform recording requires a layered recording sequence, whereby you must record a "layer" of non-overlapping holograms, before writing the next shifted layer. In this case, the capacity of a recorded region is fully utilized only when the last layer has been recorded.

Figure 2:
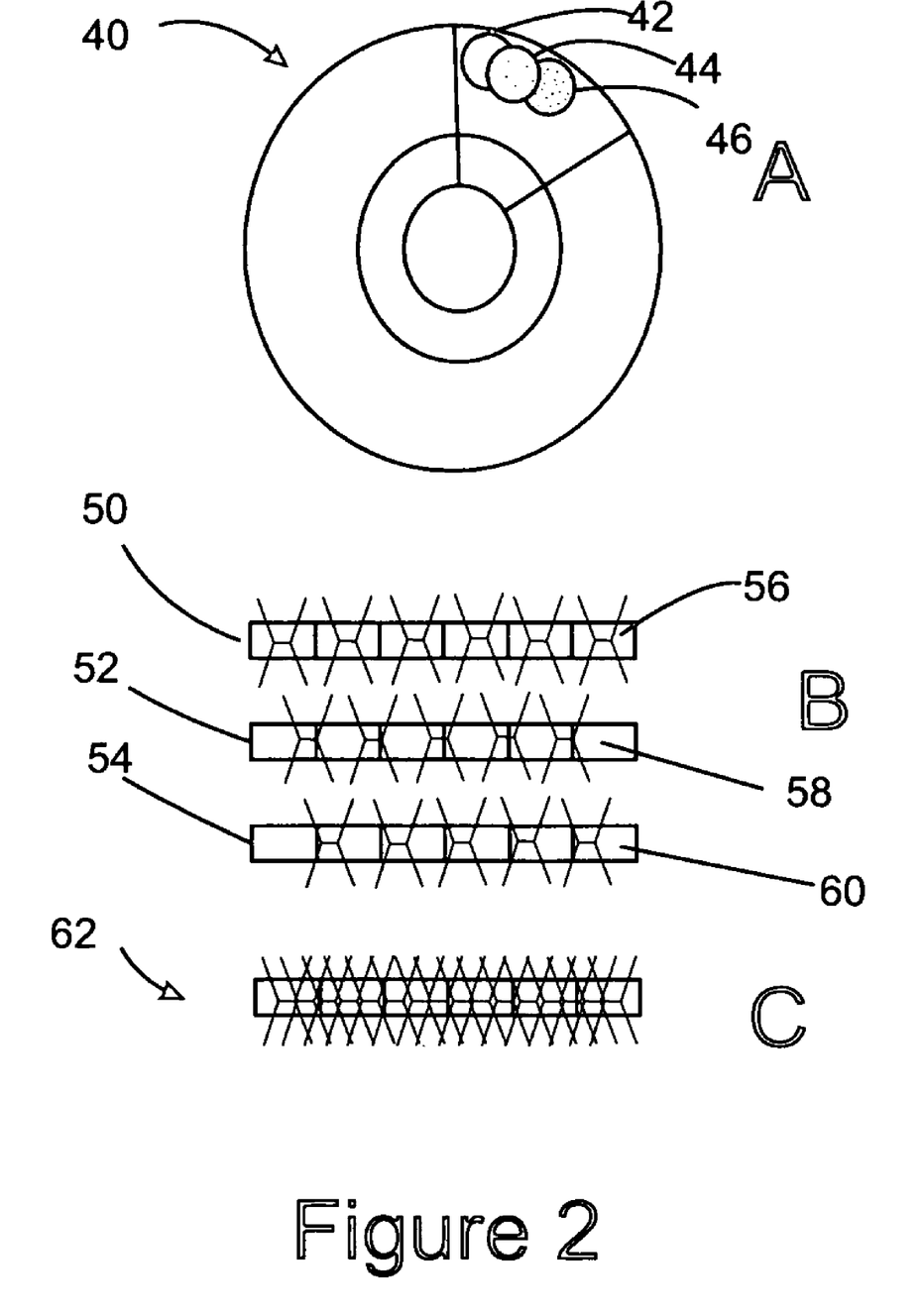
FIG. 2A is a schematic illustrating multiple layered data recording on a holographic storage disk.
FIG. 2B is a schematic demonstrating the writing to data locations in multiple layered data recording with each layer being individually depicted.
FIG. 2C is a schematic demonstrating the composite structure corresponding to FIG. 2B.

With reference to FIGS. 2A, 2B, and 2C, illustrations of methods for improving the inefficiencies inherent in single layer data recording are provided. The methods of FIGS. 2A, 2B, and 2C are still further improved by combining the methods of the present invention set forth above. Holographic data disk 40 comprises a plurality of overlapping data books, such as 42, 44 and 46. As set forth above, it should be appreciated that books 42, 44, 46 are all not written in succession, but each as part of a separate recording step of a sequence of at least two recording steps, wherein during each recording step a plurality of spatially separated books are recorded in a region of the holographic medium to form a so-called layer. The recorded layer corresponding to a recording step is spatially shifted compared to the recorded layer of the at least one other recording step so that the complete recording sequence results in book overlap. It will be appreciated by one skilled in the art that these layers do not correspond to physical separate layers in the medium. In the example of FIG. 2A there is overlap between book 44 and each of books 42 and 46, but books 42 and 46 are spatially separate and recorded in succession. FIG. 2B provides a schematic of a recording sequence comprising three recording steps resulting in overlap of three data books at any given location. In this example, layers 50, 52, 54 represent layers of spatially separate books written in separate recording steps. Layer 50 includes spatially separated books 56. Similarly, layer 52 and layer 54 include, respectively, spatially separated books 58 and 60. After layer 50 is fully populated, then books 58 in layer 52 are written. Books 58 are slightly spatially shifted from books 56. When layer 52 is fully populated, then books 60 in layer 54 are written. It should be appreciated that the order in which layers 50, 52, 54 are written may be permutated as long as uniform recording conditions are maintained for the next layer to be recorded. FIG. 2C provides an illustration of resultant arrangements of overlapped books formed upon completion of the recording sequence. In practice, individual books are discriminated upon readout by inherent selectivity associated with shift multiplexing techniques or by means of filtering techniques known to those skilled in the art.

With regard to the techniques for overlapping holograms for increased volumetric efficiency and the recording sequence required for their implementation, as described above, a recording session which represents less than the total capacity of the holographic medium or that of a given portion of its recording region may result in inefficient usage of available capacity of a data recording region, by effectively recording a smaller number of recorded layers than possible. Upon closing the recorded region, the remaining recordable layers are lost in the curing process, thus negating the capacity advantage of the layered recording technique, and in the worst case reducing it to a single layer recording.

When holographic storage media is recorded in multiple sessions, the sum of the lost capacity during the closing out of each session as a result of the boundary regions between adjacent data regions can be a significant portion of the media's capacity. In the case of multi-layered holographic recording, this is further compounded by unused capacity within each region being lost during the closing out of each session. A method minimizing the capacity lost when employing multi-session recording would be desirable.

Accordingly, there exists a need for systems and methods for managing the recording characteristics of holographic data storage media which enable effective utilization of the data storage capacity of holographic storage media. In particular, there exists a need for systems and methods which enable effective utilization of the data storage capacity of holographic storage media, in a storage environment employing both single and multiple write sessions to a same storage medium.

SUMMARY OF THE INVENTION

The present invention overcomes one or more problems of the prior art by providing a holographic storage system that records digital data to a holographic recording medium at recording locations that are strategically left open. Prior art data write processes involve an immediate step of fixing the recorded regions of the holographic medium upon completion of the data recording step. The fixing step acts to curtail the recording capability, and to produce stable readout conditions by eliminating the photo active species responsible for the data recording. The present invention advantageously utilizes the fact that in the typical holographic recording method, the fixing step is not an intrinsic part of the data recording process to postpone the fixing step operation until the data capacity of a region being recorded to is fully utilized.

The present invention therefore provides a method and system to keep write sessions open which record data only to a portion of the entire data recording region of the holographic storage medium, by postponing the closing of the partially written region until a predetermined event occurs or condition is present. Accordingly, additional data can be directly appended in the same previously and partially written regions where storage capacity remains thereby minimizing loss of capacity.

In an embodiment of the invention, a method of holographic data recording is provided. The method of this embodiment comprises providing a holographic recording medium comprising at least one data recording region. A recording region is defined as a region that includes one or more data recording locations. At least one iteration of the following steps is then performed i) providing a data light beam and a reference light beam;
ii) encoding data onto the data light beam;
iii) configuring the reference light beam;
iv) directing the data light beam and the reference light beam to a data recording location on the holographic recording medium such that a holographic grating is formed in the holographic recording medium by the interference between the data light beam and the reference light beam. This results in the holographic grating storing a currently written data page. At least one data recording location of a recorded region is left open until a predetermined event occurs or until a predetermined condition is present.

In another embodiment of the invention, the holographic storage system further includes an interim storage device for managing and aggregating multiple data backup or archival requests into a single write session. This interim storage device allows the interim storage of archival data for immediate availability, while also allowing recording to the holographic media when a sufficiently large amount of data is present on the interim storage device.

In yet another embodiment of the invention, a holographic storage system executing one or more of the methods of the invention is integrated with a front end virtualization engine optionally having independent interim storage (e.g., disk array storage). The holographic storage system of this embodiment includes a database for real time tracking and management of the evolving status of "open" (e.g., partially written) holographic media.

BRIEF DESCRIPTION OF THE DRAWINGS

FIGS. 4A-C are schematics illustrating an exemplary process for multi-session writing to a holographic medium whereby partially written regions of a holographic storage medium are left open until a predetermined event or condition occurs, and wherein:

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

In order to facilitate its description, the present invention utilizes certain terminologies, the definitions of which are set forth presently, and referred to in the following.

With respect to holographic data storage, a write session refers to a procedure for recording data, which in addition to the holographic data recording step per se, may include both pre and post processing steps for, respectively, initiating the photo reactive process responsible for the data recording in a region to be recorded to of the medium and curing the recorded region of the medium (e.g., completing the photo reactive process) for stable data readout. A write session may comprise repeating the sequence of pre-processing, data recording and post processing steps for each separate data location that is recorded to during the session or implementing the same sequence of steps, with each step being applied to at least one of a plurality of data locations, and up to the entire region recorded to in the session.

In the present invention, opening a write session refers to the pre-processing step of initiating the photo reactive process for sensitizing the medium also referred to as an opening step; closing a recorded data location or a recorded region refers to the post-processing step of curing the recorded data location or the recorded region; and closing a write session refers to the post-processing step of curing all remaining uncured recorded data locations or regions. The latter step is also referred to as fixing the recorded area, as in rendering the recording permanent.

In an embodiment of the present invention, a method of recording digital data to a holographic recording medium at recording locations that are strategically left open is provided. In accordance with the method of this embodiment, regions of a holographic storage medium are left open or only partially closed after such regions have had data recorded thereon, thus maintaining the recorded regions of holographic storage medium in a state such that additional data may be appended thereon in a separate data recording step. The present embodiment provides a solution for implementing and managing multiple write sessions to a holographic data storage medium that minimizes the loss of storage capacity associated with the closing of a partial write session.

Figure 3:
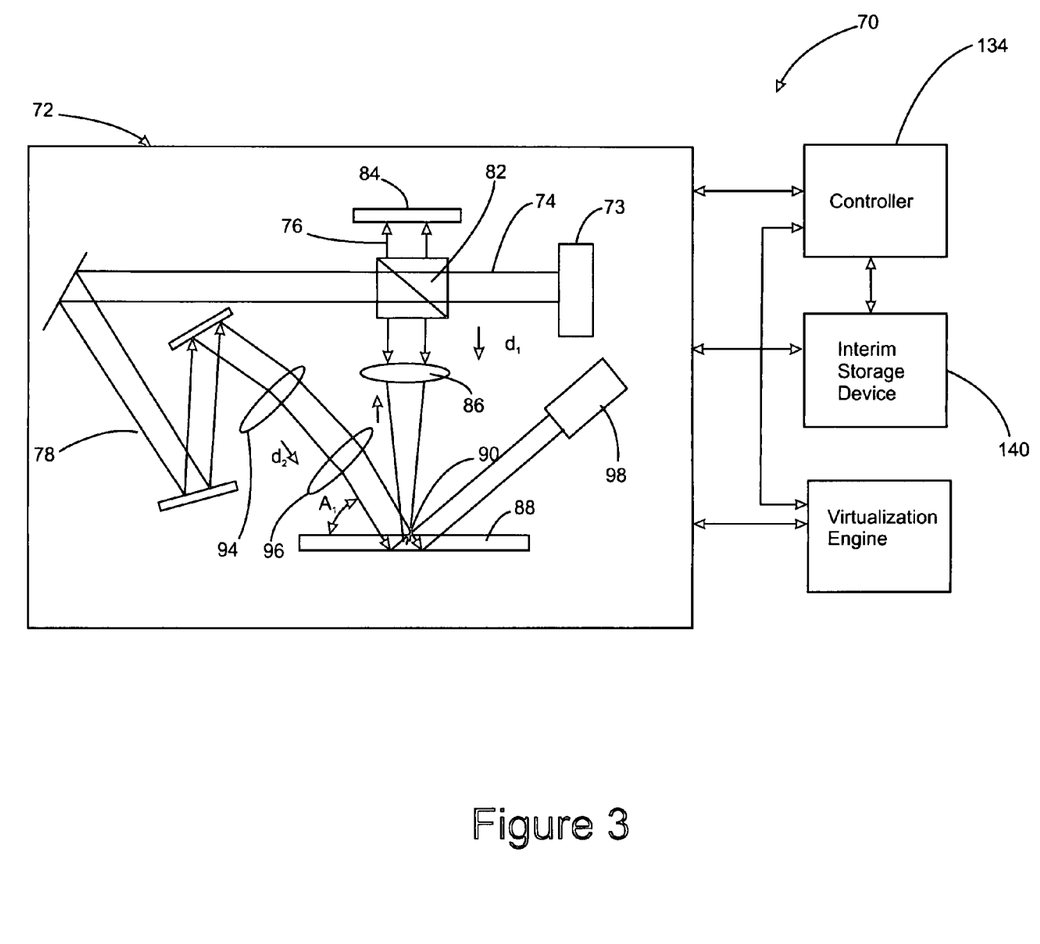
FIG. 3 is a schematic of a holographic storage system using the method of the invention in which partially written regions of a holographic storage medium are left open.

With reference to FIG. 3, a schematic of a holographic data storage system implementing the method of the present embodiment is provided. Holographic data storage system 70 comprises holographic recording system 72. Holographic recording system 72 includes a first light beam source 73 which generates light beam 74. Polarization beam splitter 82 splits light beam 74 into a transmitted portion to form a reference light beam source 78 and a reflected portion onto a spatial light modulator, SLM 84 to form data light beam 76. SLM 84 has an array of pixels that are capable of phase modulating data light beam 76. Depending on the configuration, the phase or amplitude of data light beam 76 is modulated. Accordingly, SLM 84 imprints a data page upon data light beam 76. In addition to being so modulated, data light beam 76 is also reflected by SLM 84 with the polarization of data light beam 76 being rotated upon reflection. The data light beam reflected by SLM 84 is of opposite polarization to the beam incident on SLM 84. The data light beam is then transmitted through beam splitter 82 and incident upon lens 86. Lens 86 is placed such that SLM and holographic recording medium 88 are centered in front and back focal plane of lens 86, producing a spatial Fourier transform of SLM image onto holographic recording medium 88 at recording location 90. Reference light beam 78 is directed upon holographic recording medium 88 at the same recording location 90. A holographic grating is formed by photo induced change in the index of refraction and/or the absorption of recording medium 88, said change being proportional to the spatially modulated intensity of the interference pattern produced by interference between data light beam 76 and reference light beam 78. It should be appreciated that other configurations for imaging the SLM 84 within holographic recording medium 88 may be employed to produce one of an exact image or a Fresnel image of SLM instead of a Fourier image of SLM. Data light beam 76 propagates to recording medium 88 along direction $d_1$ and reference light beam 78 propagates to recording medium 88 along direction proximate to $d_2$.

Still referring to FIG. 3, reference light beam 78 is directed by a first and second mirror upon mirror 92, and subsequently imaged by the combination of lenses 94 and 96 upon holographic recording medium 88. Preferably, lenses 94 and 96 are chosen to form a 4 f imaging system between mirror 92 and holographic data storage medium 88, such that the combination of mirror 92 and pair of lenses 94 and 96 acts as an angular scanning system for changing the angle of incidence $A_1$ while maintaining the position of incidence of reference beam 78 upon holographic data storage medium 88. Reference light beam 78 is typically a plane wave.

Data light beam 76 propagates to recording medium 88 along direction $d_1$, and reference light beam 78 propagates to recording medium 88 along a direction proximate to general direction $d_2$. In the present embodiment, the angle of incidence $A_1$ of recording reference beam 78 is used as a hologram address in that the angle of incidence of reference beam 78 determines the grating vector, i.e., the periodicity and orientation of the holographic grating formed by the interference between data light beam 76 and reference light beam 78. By changing the data page inscribed upon the data light beam 76 by SLM 84 and changing the angle of incidence of reference light beam 78, multiple data pages can be stored at same location 90.

According to the prior art, upon one of the determinations that a region has been fully written to and that no additional data remain to be recorded, each and all the regions of the holographic medium which either have been written to or have been pre-sensitized without any data actually being written to them are cured by further uniform illumination to complete the photoreaction of all remaining photosensitive species for rendering the medium stable with respect to data readout. The further illumination may be provided along one of the existing optical paths, or using additional optical system 98 which directs a strong laser beam onto recording location 90. Though not shown here, optical system 98 may comprise optical imaging elements and an additional laser source with different characteristics than the laser source used for recording, such that the optical efficiency of the curing process is enhanced.

In the method of the present invention, unlike the typical prior art methods of writing data to holographic medium 88, recording location 90 and other recorded to locations of the recording medium 88 comprising the region written to during the same recording session are left open at the completion of a data recording session unless the recording locations contain a predetermined amount of stored data. The recorded locations for which a predetermined amount of stored data is attained or surpassed are each illuminated using existing means or additional means, as set forth above, such that that recorded locations are rendered impervious to any further photoinduced changes and stable conditions for data readout are established. Typically, the predetermined amount of stored data may be substantially proximate or equal to a maximum amount of data that may be stored at recording location 90. In a variation of this embodiment, the predetermined amount of stored data is an amount beyond which an acceptable data write transfer rate is no longer met as described above.

In other embodiments of the present invention, at the end of data recording session, at least one of the at least one recorded locations (such as recording location 90) may be left open until a predetermined triggering event occurs or condition is present.

In certain embodiments of the invention, a triggering event may comprise a receipt of a data retrieval request from the portion of an already recorded region which has been kept open. As set forth above, the step of curing the recorded region is necessary for rendering stable data readout conditions. In a further method of the present invention, retrieval of requested data may be accomplished by one of closing the entire session and partially closing the session to the extent necessary to retrieve the requested data. Closing the entire session comprises curing the entire recorded data region, whereas partially closing the session comprises only curing a region sufficient to access the data storage locations (such as recording location 90) storing the requested data, keeping the remainder of partially recorded area open for appending additional data. By delaying closing partially written regions of recording medium 88 and closing only regions that absolutely need to be closed, loss of storage capacity is minimized.

In certain embodiments of the present invention, the determination of keeping certain locations open may be made internal to the holographic data recording system 72. Holographic data recording system 72 may comprise additional processing elements as well as computer program and buffer memory for storing necessary media recording status to effect such determination. Buffer memory preferably comprises a non-volatile memory.

Figure 4:
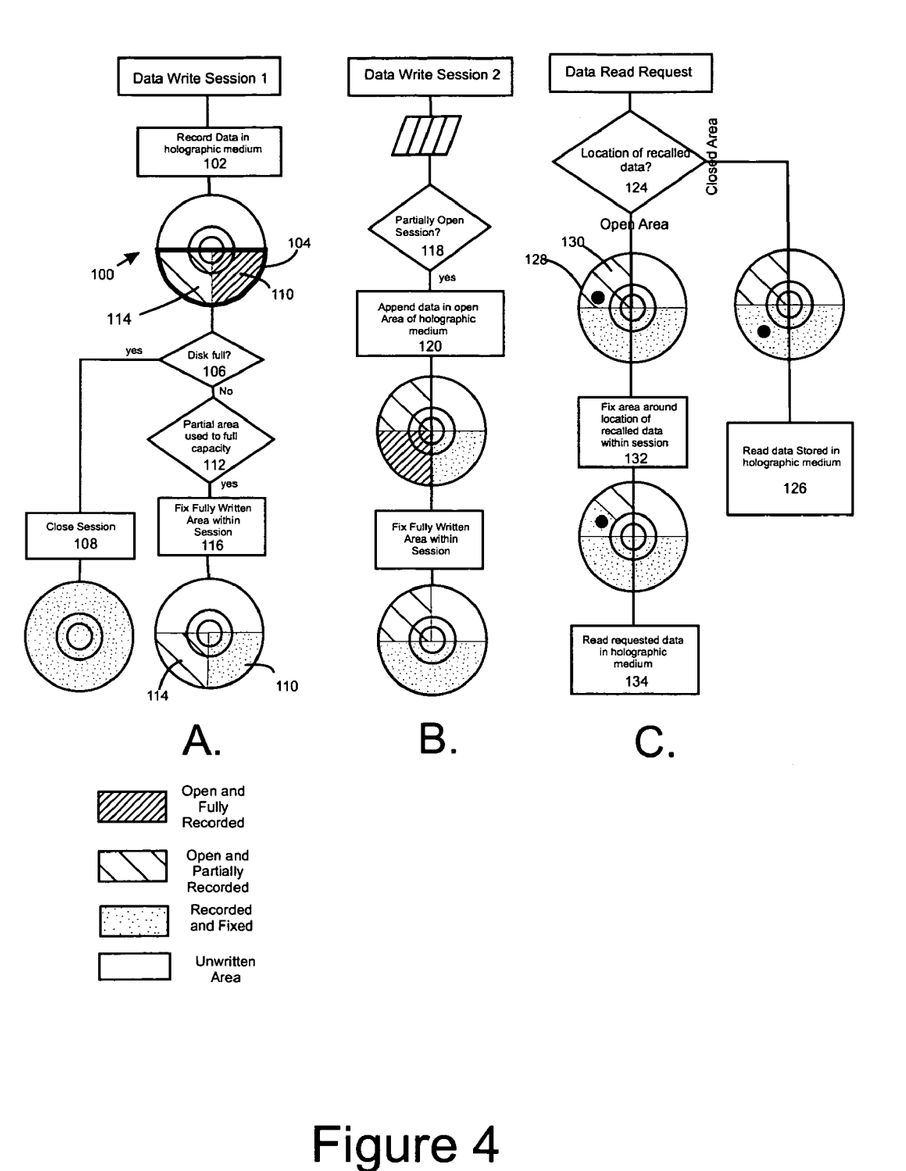
FIG. 4A is a flowchart showing an initial write session in accordance with an embodiment of the invention.
FIG. 4B is a flowchart showing a subsequent write session in accordance with an embodiment of the invention.
FIG. 4C is a flowchart showing the handling of a data read request in accordance with an embodiment of the invention.

With reference to FIGS. 4A, 4B, and 4C, flowcharts illustrating exemplary steps of a multi-step process for implementing multiple write sessions using the methods of the invention are provided. In FIG. 4A, data is recorded to a holographic medium 100 during write session 1 as indicated by Step 102. A determination is made as to whether holographic medium 100 is full or not as indicated by Step 106. If holographic medium 100 is full, the write session is closed with holographic medium 100 being fixed such that additional data cannot be appended thereto (Step 108). If medium 100 is not full, a determination is made as to whether a recorded area 110 is used to full capacity (Step 112). If a recorded area 110 of recorded region 104 is at a predetermined capacity then area 110 is closed (step 116) and other only partially recorded areas 114 of recorded region 110 are left open for appending data in a subsequent write session. FIG. 4B describes the next write session, write session 2 to the same holographic medium 100. A determination is made as to whether holographic medium 100 contains a partially open region from a previous only partially closed session (Step 118). If there is an open session, data is first appended to partially recorded locations of still open area 114 as indicated by step 120, until all recording locations of open area 114 have reached their predetermined capacity, at which point data is then written to remaining previously unrecorded regions of holographic medium 100. Again, upon completion of data recording, steps 106 to 116 are repeated, such that any appended to or newly recorded to areas that have been fully written to are closed and any partially written areas are kept open. FIG. 4C describes the process of retrieving data in response to a request for data stored on partially recorded medium 100. As shown in step 124, a determination is made as to the location of the data being requested. If the data is in a closed region, the data is merely read (Step 126). If the data being requested in open region 130, area 128 around the location which contains the data is fixed (Step 82). Finally, the requested data is then read (Step 134).

Referring once again to FIG. 3, in certain embodiments of the present invention, data storage system 70 may comprise other data handling elements, such as controller 134. Controller 134 is in electronic communication with an external source and with holographic data storage system 70, and generally receives and transmits data and data requests to and from the external source and the holographic data storage system 70. In certain embodiments of the present invention, controller 134 may be configured to determine whether predetermined events occur or predetermined conditions are present, based on recording medium status information provided by the holographic data recording system 72.

In yet other embodiments of the invention, the holographic storage system further includes an interim storage device for managing and aggregating multiple data backup or archival requests to form a data set of size equivalent to the full capacity of a holographic medium and recorded in a single write session. With reference to FIG. 3, holographic storage system 70 further includes interim storage device 140. Data received by controller 134 is first stored on interim storage device 140. In certain embodiments it may be also simultaneously written to holographic medium. In other embodiments, the data is subsequently transferred to holographic recording system 72 and recorded upon holographic medium 88 upon occurrence of the aggregate amount of data stored on interim storage device 140 reaching a predetermined amount.

Interim storage device 140 is advantageous for simplifying the management and increasing the effective capacity utilization of write once read many ("WORM") holographic media, by minimizing the number of write sessions needed for recording a holographic medium to full capacity. Interim storage device 140 is also advantageous in that the interim storage of archival data on interim storage device 140 renders the entire archival data immediately available for readout while also recording it to the holographic medium 88 in a manner consistent with optimal utilization of the capacity of holographic medium.

In different embodiments of the present invention, the recording of incoming data to the holographic medium may be implemented synchronous or asynchronous to the recording of data to interim storage device 140, or as a selectable one of both synchronous and asynchronous recording modes. For synchronous recording, and as set forth above, a write session is opened by sensitizing one of a fraction of the recordable area of the holographic medium or its entirety, for recording a first set of incoming data to holographic storage medium 88, however the recorded areas are not cured, or only those that have been recorded to full capacity, thus keeping the write session open such that a second data set, temporally separate from the first set of incoming data, may be recorded as a direct appendage to any partially recorded area.

For asynchronous recording, incoming data is stored on interim storage device 140, until storage device 140 contains a first set of data of a selectable size, at which point it is recorded in a single continuous recording session to the holographic recording medium. The selectable size of the data set being transferred from interim storage device 140 to controller 134 onto holographic storage device 72 for recording to holographic medium 88 may correspond to a substantially large fraction of the capacity of the holographic medium. Subsequent incoming data is also first stored on interim storage device 140 to form a second set of data until second set of data reaches a selectable size, at which point it also is transferred and recorded to onto at least one of the same and a different holographic medium, according to the selected sizes for first and second data sets and the remaining capacity of the holographic medium.

The size of the data set is generally between 20 percent, preferably 50 percent of a holographic medium's capacity, and the lesser of the total capacity of the holographic medium and of 80%, preferably 50% of interim storage device capacity. However, the selected size may be any other amount consistent with the requirements and characteristics of a data storage system or with the requirement of a particular application.

In certain embodiments of the present invention, upon completion of the recording of data set to a fraction of the recordable area of the holographic medium, the recorded areas are not cured, or only those that have been recorded to full capacity, thus keeping the write session open such that a second data set, temporally separate from the first set of incoming data, may be recorded as a direct appendage to any partially recorded area.

In other embodiments, upon completion of the recording of a data set, the entire area recorded to may be closed by curing step. The reduced number of write sessions minimizes the capacity loss incurred by closing each session, while advantageously maintaining system complexity low, by not requiring the storage of information on open storage locations and their remaining capacity or management of the process of first appending new data to partially recorded storage locations. In those embodiments of the present invention wherein upon completion of the recording of a data set to a fraction of the recordable area of the holographic medium those recorded areas that have been recorded to full capacity are cured, the corresponding data on interim storage device 140 is optionally removed upon closure of such regions, as data may now be read directly from holographic storage medium. Accordingly, after recording of a data set to holographic medium 88, interim storage device 140 needs only retain the portion of data from a given holographically recorded data set, which corresponds to data recorded in only partially recorded areas. Thus, a greater portion of the capacity of interim storage device 140 is available for temporarily storing additional incoming data, until a subsequent recording to a holographic storage medium. Examples of suitable interim storage devices include storage devices such as a magnetic disk or array thereof, non-volatile solid state storage devices such as flash memory and magnetic random access memory.

In yet another embodiment of the invention, a method and holographic storage system for tracking and managing write sessions are provided. According to a general method of the invention set forth above, if a write session does not completely fill holographic medium and only records to a fraction of the recordable region, the session may be left open or partially open, in order to conserve the remaining capacity in the areas recorded only to a fraction of their achievable capacity. In this embodiment, the method further comprises storing the data file information and holographic media status in a database, and using the information contained in the database to determine and control the occurrence and allocation of subsequent write sessions to new or previously partially recorded to holographic media, by mapping data set to be recorded to existing remaining capacity on open holographic media.

Figure 5:
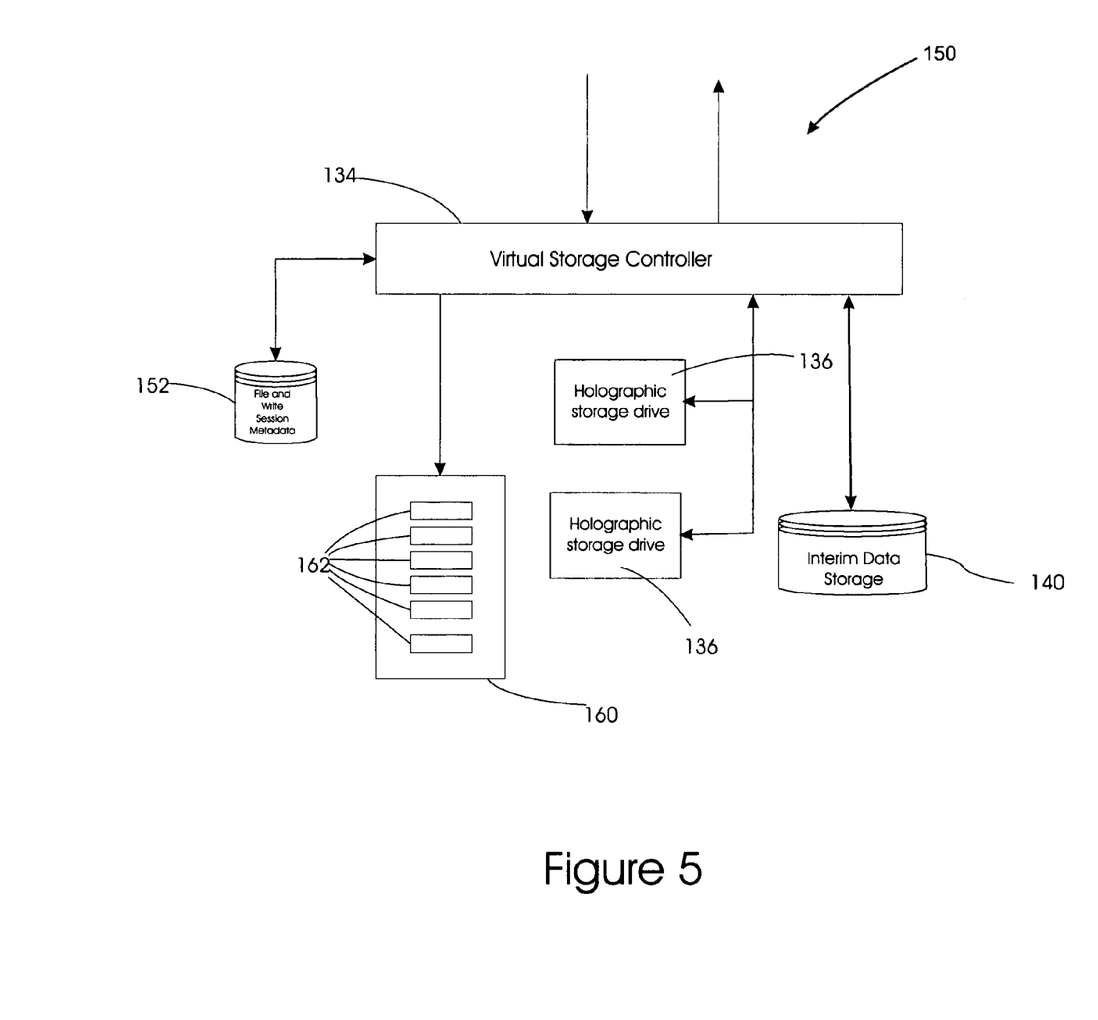
FIG. 5 is a schematic of the holographic data storage system used in embodiments of the invention.

Referring to FIG. 5, the holographic data storage system 150 of this embodiment includes a virtual storage controller 134, holographic recording system 136, an interim storage device 140, and a database 152 for storing file and holographic media information (also termed metadata) for tracking and managing the process of opening and closing sessions. Virtual storage controller 134 emulates at least one selectable storage device for communicating with an external source. The at least one emulated device may include at least one of a holographic, optical and magnetic type. Holographic data storage system 150 may also comprise a data storage media repository 160 for storing a plurality of removable media such as holographic medium 162. The database 152 may be stored on interim storage device 140, or on a separate storage device, comprising non-volatile memory device. Storing the database 152 on a separate fast random accessible memory may be advantageous in terms of system performance. Database 152 may be a single database integrating both file and holographic media metadata, or may comprise at least two databases containing, respectively, file metadata and media metadata. Database 152 includes, for example, a mapping of "inactive", "open", and "closed" regions, and the remaining capacity in the different regions of each media, as well as a log of the various operations effected on each media and their time of occurrence. Database 152 provides tracking status of "open" (e.g., partially written) holographic media for managing the transfer of data sets and allocation to already partially recorded holographic media for holographic recording. Controller 134 may also comprise a suitable algorithm or computer program operable to map and assign new data sessions to "open" media.

As set forth previously, the pre-processing step of initiating the photo reactive process for sensitizing the medium also referred to as an opening step may cause the medium to slowly evolve even in the absence of light exposure. Therefore, after a predetermined period of time, the partially written location may be closed in order to mitigate the effects of this slow change and prevent any degradation of data recording. Accordingly, in a further method of the present invention, regions of a holographic storage medium are left open or only partially closed after such regions have had data recorded thereon in a write session, and after a predetermined length of time, closing all remaining open regions from a corresponding write session. The method also comprises storing holographic media status in a database, and managing the closing of media regions according to the earliest occurring triggering event of the region reaching full capacity utilization and the time elapsed since first opening the region reaching a predetermined amount. Typically, the method of the present embodiment will function in a first out ("FIFO") manner. The holographic storage system of this embodiment is similar to the system illustrated in FIG. 5 and described above, except controller 134 or controlling mechanism operable to map and assign new data sessions to "open" media is further operable, for determining the amount of time and capacity remaining in "open" sessions in order to optimize capacity utilization while ensuring data integrity. Typically, an algorithm or computer program may be employed for determining the allocation of data sets to be recorded to "open" holographic media which both minimizes the amount of time "open" sessions remain "open" or uncured and maximizes remaining capacity utilization.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of holographic data recording, the method comprising:
    a) providing a holographic recording medium comprising at least one data recording region, the at least one recording region including one or more data recording locations;
    b) performing at least one iteration of the following steps:
        i) providing a data light beam and a reference light beam;
        ii) encoding data onto the data light beam;
        iii) configuring the reference light beam;
        iv) directing the data light beam and the reference light beam to a data recording location on the holographic recording medium such that a holographic grating is formed in the holographic recording medium by the interference between the data light beam and the reference light beam, the holographic grating storing a currently written data page, and
    c) receiving a request for data stored at the data recording location on the holographic recording medium;
    d) determining if the data recording location is a closed region;
    e) fixing an area around the data recording location if the region is open; and
    f) reading the data in the data recording location.

2. The method of claim 1 further comprising recording additional data by:
    determining whether there is a recorded region with at least one open recording location; and
    writing the additional data to the at least one open data recording location of the recorded region if present.

3. The method of claim 1 wherein the at least one data recording location is closed if the amount of recorded data is greater than or equal to a predetermined amount of data.

4. The method of claim 1 wherein the at least one open data recording location is closed by fixing the at least one open data recording location.

5. The method of claim 1 wherein each data recording location of the holographic recording medium is capable of holographically recording multiple data sets comprising a single bit or an array of bits.

6. The method of claim 1 wherein data is holographically recorded to one or more overlapping data recording locations.

7. The method of claim 6 wherein data is holographically recorded by a process selected from the group consisting of shift multiplexing, tilt multiplexing, and polytopic multiplexing.

8. The method of claim 1 wherein the at least open data recording location is closed after a predetermined period of time.

9. The method of claim 1 wherein the data is stored in an interim storage device prior to being holographically recorded.

* * * * *

UNITED STATES PATENT AND TRADEMARK OFFICE
CERTIFICATE OF CORRECTION

| | | |
|---|---|---|
| PATENT NO. | : 7,557,971 B1 | Page 1 of 1 |
| APPLICATION NO. | : 11/372689 | |
| DATED | : July 7, 2009 | |
| INVENTOR(S) | : Christophe N. Sigel et al. | |

It is certified that error appears in the above-identified patent and that said Letters Patent is hereby corrected as shown below:

On the title page item (73), should read: --Storage Technology Corporation, Louisville, CO (US)--.

Signed and Sealed this
First Day of February, 2011

David J. Kappos
*Director of the United States Patent and Trademark Office*